United States Patent [19]
Maybach et al.

[11] Patent Number: 4,782,516
[45] Date of Patent: Nov. 1, 1988

[54] FRAUD PREVENTION IN A PUBLIC TELEPHONE STATION

[75] Inventors: Richard L. Maybach, Holmdel; S Devendra K. Verma, Middletown, both of N.J.

[73] Assignee: AT&T Information Systems Inc. American Telephone and Telegraph Company, Murray Hill, N.J.

[21] Appl. No.: 66,288

[22] Filed: Jun. 25, 1987

[51] Int. Cl.⁴ .............................................. H04M 1/66
[52] U.S. Cl. ..................................... 379/189; 379/145
[58] Field of Search ............... 379/189, 145, 155, 131, 379/132, 387, 188, 199

[56] References Cited

U.S. PATENT DOCUMENTS

| | | | |
|---|---|---|---|
| 4,182,934 | 1/1980 | Keys et al. | 379/189 |
| 4,612,419 | 9/1986 | Smith | 179/90 D |
| 4,698,840 | 10/1987 | Dively et al. | 379/155 X |

OTHER PUBLICATIONS

TE&M Special Report Payphone/Cocot "Intelligence Makes Payphones Pay", Mar. 15, 1978, by John S. Vaughan.

Primary Examiner—James L. Dwyer
Attorney, Agent, or Firm—Samuel R. Williamson

[57] ABSTRACT

Control equipment employed in a customer-owned public telephone station prevents a user from making unauthorized telephone calls in the telephone system. Operating under the control of a computer in the station, the control equipment is responsive to momentary loop breaks occurring on tip and ring lines connecting the station to a central office, and to a loop break provided by the central office which reflects that the far end party has disconnected. The control equipment is also responsive to scheduled as well as as unscheduled receipt of dial tone. The combination of ongoing loop break and dial tone detection and analysis conveniently provides the desired protection for reliable operation of the customer-owned public telephone station in the telephone system. Restrictions incorporated in the station for obtaining the desired protection are applied with minimal inconvenience for the legitimate user.

16 Claims, 2 Drawing Sheets

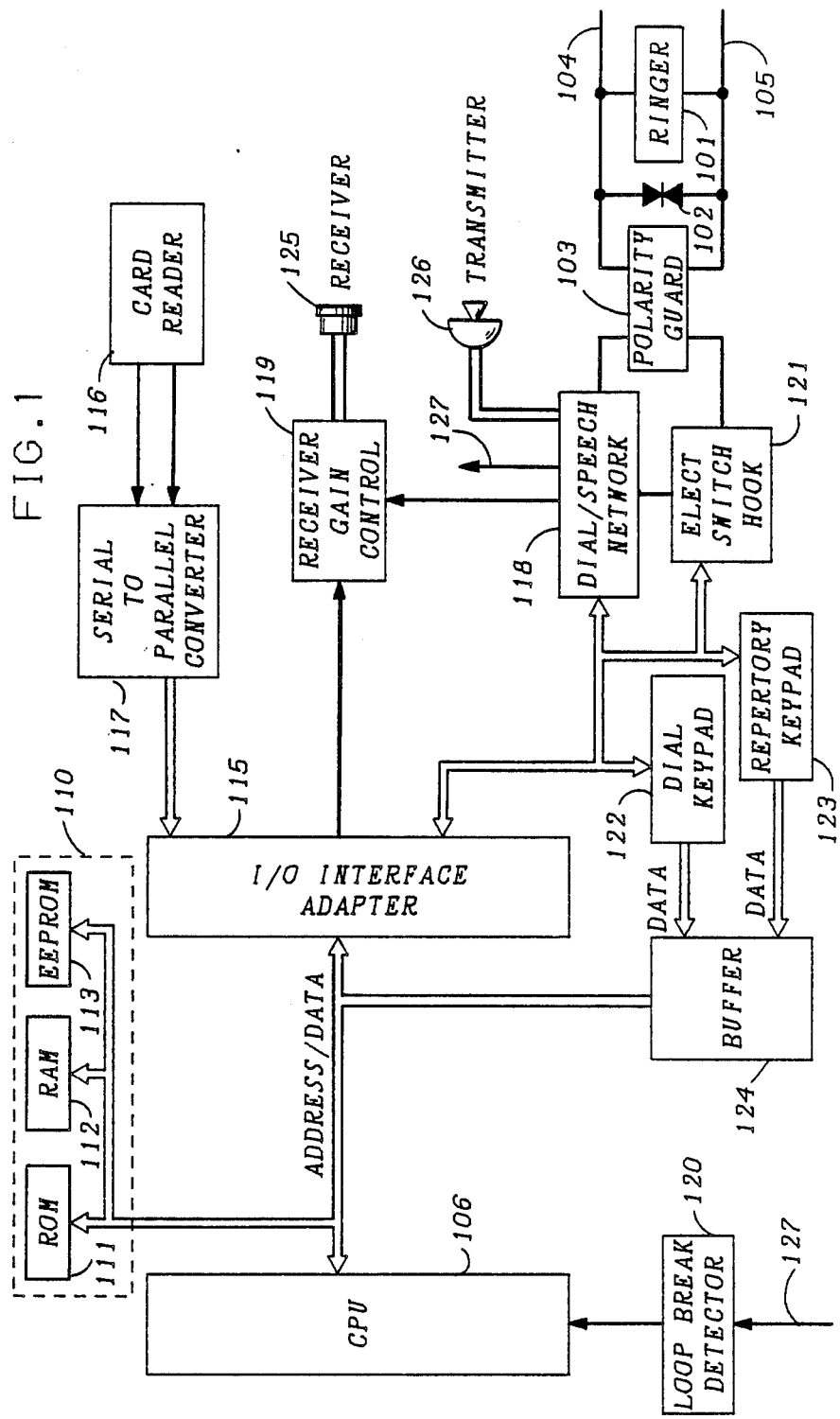

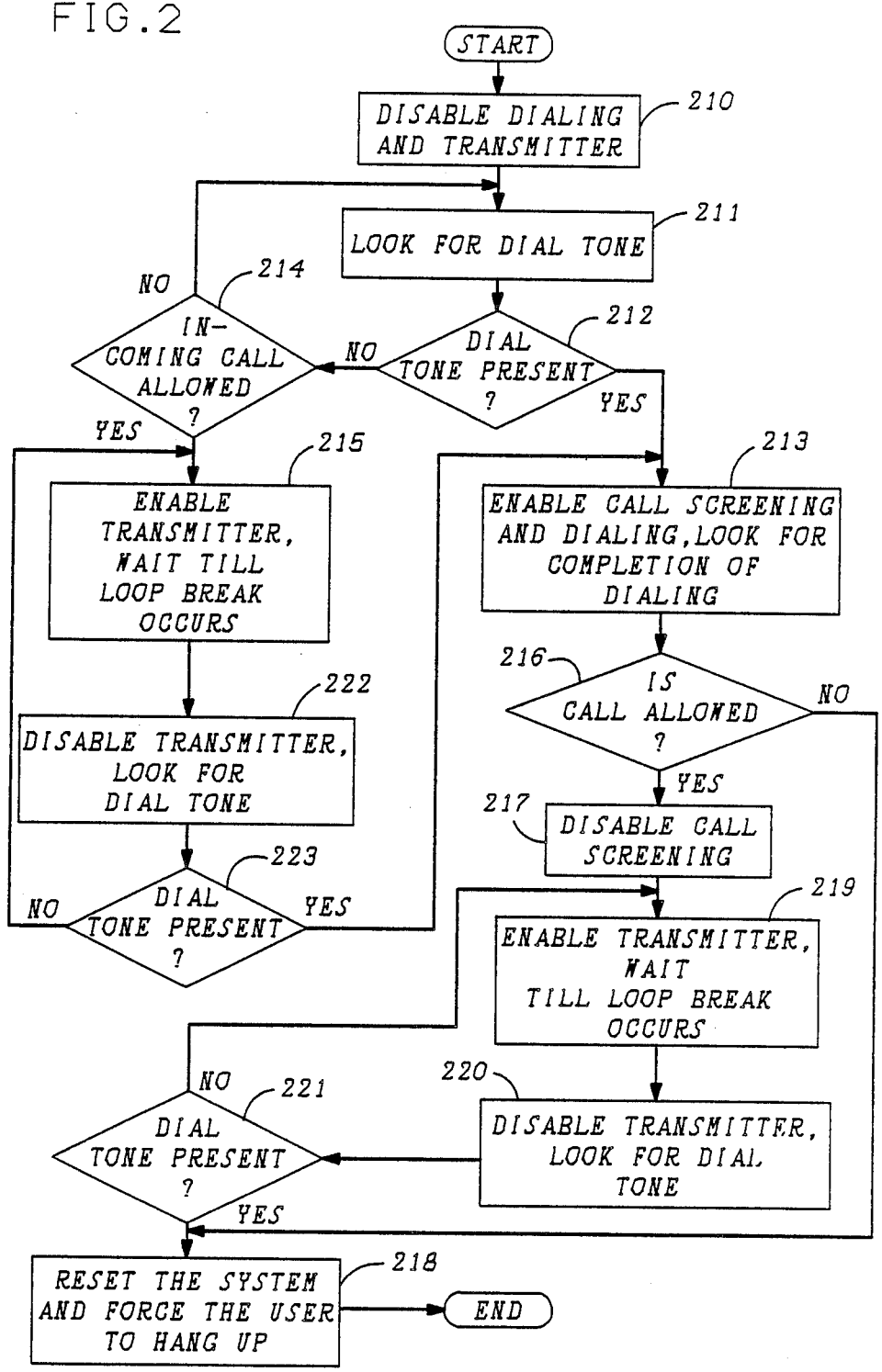

1

FRAUD PREVENTION IN A PUBLIC TELEPHONE STATION

BACKGROUND OF THE INVENTION

1. Technical Field

The present invention relates to public telephone stations and more specifically, to control equipment within a public telephone station that guards against a user making unauthorized telephone calls.

2. Description of the Prior Art

Public telephone improvement programs in the last decade have resulted in a multitude of telephone station innovations that serve customer needs and reduce operating costs. Illustratively, one such product is the customer-owned public telephone station. These are telephone stations that are purchased by non-telephone company customers who then lease or resell the stations.

Many services available for a telephone company-owned public telephone station are not available for the customer-owned public telephone station. For example, a telephone company-owned public telephone station operating on a charge-a-call line is provided with call screening, call blocking, call rating, and fraud protection through the telephone company's traffic service position system (TSPS) facilities for noncommercial credit card calls and through the telephone company's call processor for commercial credit card calls.

The customer owned public telephone station is usually connected to a central office via a measured business service line (1MB). This line accepts all outgoing calls and, like a regular telephone line, also accepts charges on collect and third party calls. This type of line, therefore, provides greater opportunity for user fraud. To minimize the occurrence of such fraud, a restriction should be provided at some point on the measured business service line to screen incoming calls billed to the line, such as third party or collect calls. Furthermore, when the far end party disconnects at the end of a call and the user of the telephone station remains off-hook, the central office may possibly restore dial tone. Without additional protection, therefore, the user may then place a call that would be free to the user but billed to the lessor of the measured business service line.

In view of the foregoing, it is apparent that a need exists for control equipment that prevents fraudulent use of a customer-owned public telephone station.

SUMMARY OF THE INVENTION

In accordance with the invention, control equipment employed in a customer-owned public telephone station prevents a user from making fraudulent telephone calls on a measured business telephone line. Operating under the control of a computer in the station, the control equipment is configured to be responsive to momentary loop breaks occurring on tip and ring lines connecting the station to a central office, and to those loop breaks provided by the central office that reflect that the far end party has disconnected. The control equipment is also configured to be responsive to scheduled as well as unscheduled receipt of dial tone.

In response to the reception of both a loop break and a dial tone from the central office, the control equipment either activates a call screening process at the station or terminates a telephone connection then existing between the station and the central office. If the telephone connection between the station and the central office was established by an incoming call to the station, the control equipment activates the call screening process upon receipt of both the loop break and dial tone. This is necessary, because if the dial tone is delayed on an outgoing call, it will be classified as an incoming call until this point. But if the telephone connection between the station and the central office was established by an outgoing call from the station, the control equipment terminates the telephone connection then existing between the station and the central office upon receipt of both the loop break and dial tone.

The combination of ongoing loop break and dial tone detection and analysis conveniently provides the desired fraud prevention for operation of the customer-owned public telephone station in the telephone system. The restrictions incorporated in the public telephone station for attaining the fraud prevention are applied with minimal inconvenience for the legitimate user.

BRIEF DESCRIPTION OF THE DRAWING

The invention will be more clearly understood from a consideration of the following detailed description of an illustrative embodiment of the invention and the accompanying drawing in which:

FIG. 1 shows a block diagram of the major functional components of a customer-owned public telephone station; and FIG. 2 shows a flow chart of some of the functions performed by the telephone station of FIG. 1 in accordance with the invention.

DETAILED DESCRIPTION

Referring now to FIG. 1 of the drawing, there is shown a block diagram of a customer-owned public telephone station having a ringer 101, a varistor 102 and a polarity guard 103, which are included to show an illustrative connection between a telephone station and the tip and ring terminals 104, 105 of a telephone line in accordance with the invention. The numerous features and functions of the public telephone station are controlled by a central processing unit (CPU) 106. CPUs are commercially available. A CPU commercially available from Intel Corporation as Part No. 80C31 can be used for CPU 106 with the proper programming. The telephone station also includes a memory section 110, which interfaces with and stores data for proper operation of the CPU 106. This memory section comprises read only memory (ROM) 111, random access memory (RAM) 112 and electrical erasable programmable read only memory (EEPROM) 113. Connected to the CPU 106 and the memory section 110 is a peripheral input/output interface adapter 115, which includes interface circuitry and multiple ports for interfacing the CPU 106 with other circuitry in the telephone station. This adapter 115 also contains additional random access memory for processing calling card data obtainable from a card having a magnetic stripe and read by a magnetic stripe card reader 116. A serial to parallel converter 117 converts the serial data from the card reader 116 into a parallel format and then couples this data to the adapter 115. This data is ultimately coupled by the station via the tip and ring lines 104, 105 to a call processor associated with the station, but usually located remote therefrom. A timer in the adapter 115 provides the timing for the data that is input from the magnetic strip card reader 116.

Power for operation of the station is provided from a telephone central office or switching facility (not shown) over a measured business line to the tip and ring terminals 104, 105. Full operation of the station is possible on as little as 18 milliamps. If the current over this loop from the central office should drop to below 18 milliamps, the CPU 106 enters an idle state for a reduced power operating condition allowing a speech-only mode described later herein. A second timer in the adapter 115 remains active for counting instruction cycles when the CPU 106 enters this idle state.

Other circuitry in the station includes a dial/speech network 118, a receiver gain control 119, a loop break detector 120 and an electronic switch hook 121.

The dial/speech network 118 contains a speech hybrid for separating and combining the appropriate received and transmit audible signals, a touch-tone synthesizer for generating tones reflective of the digits entered on a dial key pad 122, and also mode control circuitry connected via the interface adapter 115 to the CPU 106. The mode control circuitry determines if sufficient loop current is available over the tip and ring lines to enter a full-feature mode. In this full-feature mode, the dial/speech network 118 is allowed to outpulse tone signals to the tip and ring terminals 104, 105. As indicated, with a loop current of less than 18 milliamps, the mode control circuit configures the station in the speech-only mode. In this speech-only mode, the station can transmit and receive speech signals but cannot perform any other functions. As the loop current increases to 18 milliamps or greater, the circuit switches to the full feature mode. The dial/speech network 118 also detects when a loop break occurs. A loop break is an interruption of the current in the loop formed by the central office, the tip and ring lines and the telephone station. This loop break information is provided over line 127 to the loop break detector 120.

The loop break detector 120 provides the loop break information to the CPU 106 in the form of an interrupt signal as each loop break occurs. The CPU 106 then determines if the interrupt signal is a valid loop break by examining the state of the electronic switch hook 121. If the switch hook 121 has been operated, then opening of the loop occurred therein and the loop break is not considered valid. If the loop break occurred elsewhere (on the tip and ring lines or at the central office), it is considered valid. For a valid loop break, the CPU 106 sets all circuits to a low power state, and the station goes into the speech-only mode while the loop breaks exists. When the loop break ends, the station exits the speech-only mode and returns to the full-feature mode.

Certain users of the station may have need for the receiver 125 to operate at some amplification level above the nominal level. The receiver gain control 119 provides this amplification to the received signal by operating at three levels; nominal gain, 6 dB above nominal gain and 12 dB above nominal gain. The receiver gain control is connected to the dial/speech network 118 for receiving the received signal and to the adapter 115 for receiving appropriate control information.

Telephone number input into the station by a user is through key pad circuitry comprising the dial key pad 122 and a repertory key pad 123. The dial key pad 122 is used for normal dialing of the digits between zero and nine for a regular telephone call. The star and pound key are also included on the dial key pad 122 for those functions where they are required. The repertory key pad 123 provides access to a collection of telephone numbers prestored by the owner of the customer-owned telephone station. These are numbers which the customer has access to and may dial by depressing only one or two digits. Information from the key pads 122, 123 is provided to a buffer 124 which is read by the CPU 186.

Referring now to FIG. 2, there is shown a flow-chart illustrating the operation of the telephone station of FIG. 1 in performing the call screening and fraud protection operations. The functions provided by CPU 106 are advantageously determined by a process or program stored in memory section 110. The process begins at step 210 where the dial and repertory key pads 122, 123 and the transmitter 126 are disabled when a user places the station off-hook. Disabling the transmitter insures that a user cannot fraudulently dial a telephone number using an acoustically coupled device. The process next advances to step 211 where the station waits a predetermined period for the receipt of dial tone. In this predetermined period, the dial tone should appear within typically two seconds and remain for typically 200 milliseconds in order to satisfy the criteria that dial tone is present. These times can be changed to accommodate different central office equipment.

The process next advances to the decision 212. If the dial tone has appeared within the time period determined by step 211, the call is classified as outgoing and the process advances to step 213, explained later herein. On the other hand, if the dial tone has not appeared within the time period, the call is classified as incoming and the process advances to decision 214. This decision determines whether to allow or not allow the incoming call from a remote telephone station. Allowing or not allowing incoming calls is an optional feature of the telephone station easily selectable by the owner or lessee of the station simply setting an appropriate flag in the program. If the incoming call is not allowed, the process returns to step 211 where the station once again waits for the receipt of dial tone. This loop is repeated until the calling party at the distant end hangs up and the attempted call is terminated.

If incoming calls are allowed, the process advances from decision 214 to step 215, where the transmitter is enabled and the station begin to monitor the tip and ring lines for a loop break. When the calling party hangs up at the end of a call, there is an opportunity for fraud if the central office simply returns dial tone and the station does not detect and react to it in some way. For example, if the station is fully activated when dial tone returns and remains so, a user could potentially place a telephone call without paying for it. The process thus remains at this step while the calling and called parties converse. Once the calling party at the remote telephone station hangs up, the central office sends a loop break followed by dial tone.

When a loop break occurs, the process advances to step 222 wherein the transmitter is disabled and the station awaits a predetermined period, approximately 500 milliseconds, for the receipt of dial tone. The dial tone should also remain for 200 milliseconds in order to satisfy the criteria that dial tone is present. Again, these times are typical. The process next advances to decision 223, where it is determined whether the dial tone has appeared within the time period determined by step 222. If the dial tone is determined to be present, then the process advances to step 213, wherein call screening is enabled and the call is treated as an outgoing call. If dial tone is not determined to be present, then the process returns to step 215, wherein the transmitter is enabled by the station and the parties are again allowed to converse. The receiver 125 is enabled by the station throughout the process.

That part of the process involved in placing an outgoing call essentially starts at Step 213 where call screening is activated and the dial and repertory key pads are enabled for dialing. At this point the process also tests for dialing completion. Dialing is considered complete when (1) the time since the last key was pressed exceeds the interdigit time out interval (typically 10 seconds), or (2) a ring back or busy tone is received from the central office, or (3) the call is classified as blocked or invalid. In performing call screening in accordance with the invention, as each digit in a telephone number is dialed, it is compared to numbers stored in a look-up table in EEPROM 113 (FIG. 1) to determine if it is a free call, a blocked call or a charged call. The process next advances to decision 216 wherein the type of call is determined from the telephone number dialed. For a call that should be blocked or is considered invalid, the process advances to step 218 wherein the system is reset and the user is forced to go on-hook. The user can then, if desired, begin a new call.

For those calls that are determined in decision 216 to be free or charged calls, the process advances to step 217 wherein call screening is disabled. The process next advances to step 219 wherein the transmitter is enabled, the outgoing call placed and the calling and called parties engage in conversation. The process then waits at this step and monitors the tip and ring line for a loop break.

When a loop break occurs, the process advances to step 220 wherein the transmitter is disabled and the station awaits a predetermined period, typically 500 milliseconds, for the receipt of dial tone. This period allows false loop breaks to occur without resetting the system. The dial tone should appear within the 500 milliseconds and also remain for 200 milliseconds in order to satisfy the criteria that dial tone is present. (Again, the times are typical.) The process next advances to decision 221, where it is determined whether the dial tone has appeared within the time period determined by step 220.

If dial tone does not appear in the time period, the process returns to step 219, wherein the transmitter is enabled by the station and the parties are again allowed to converse. On the other hand, if dial tone does appear in the time period determined by step 220, the process advances to step 218 wherein the user is forced to go on-hook.

Various modifications of this invention are contemplated and may obviously be resorted to by those skilled in the art without departing from the spirit and scope of the invention as hereinafter defined by the appended claims.

What is claimed is:

1. A fraud prevention circuit for use in a telephone station for restricting telephone calls originating at the station, the circuit comprising:
   means for establishing an initial telephone connection between the telephone station and a switching facility over a pair of input lines;
   means for receiving a loop break from the switching facility, the loop break being reflective of a momentary interruption in the telephone connection;
   means for receiving a dial tone signal from the switching facility; and
   means for receiving a call screening process in the telephone station, the call screening process allowing only certain telephone calls to originate at the telephone station, and the means for activating the process being provided in response to the joint reception of the loop break and the dial tone signal from the switch facility.

2. The fraud prevention circuit as in claim 1 wherein the means for establishing an initial telephone connection further includes means for receiving an initial telephone call through the switching facility, and means for enabling a telephone transmitter associated with the telephone station.

3. The fraud prevention circuit as in claim 1 wherein the means for activating a call screening process in the telephone station further includes means for disabling a telephone transmitter associated with the telephone station.

4. The fraud prevention circuit as in claim 3 further including:
   means for establishing a subsequent telephone connection between the telephone station and the switching facility over the input lines;
   means for terminating the subsequent telephone connection between the telephone station and the switching facility, the means for terminating the subsequent connection being provided in response to the joint reception of the loop break and the dial tone signal from the switching facility.

5. The fraud prevention circuit as in claim 4 wherein the means for establishing the subsequent telephone connection includes means for receiving dial tone for the placing of a telephone call to a remote telephone station through the switching facility, and means for dialing the telephone number associated with the remote telephone station.

6. The fraud prevention circuit as in claim 4 wherein the means for terminating the subsequent telephone connection further includes disabling the telephone transmitter associated with the telephone station.

7. A fraud prevention circuit for use in a telephone station for restricting telephone calls originating at the station, the circuit comprising:
   means for establishing an initial telephone connection between the telephone station and a switching facility over a pair of input lines;
   means for receiving a loop break from the switching facility, the loop break being reflective of a momentary interruption in the telephone connection;
   means for receiving a dial tone signal from the switching facility; and
   means for terminating the telephone connection between the telephone station and the switching facility, the means for terminating being provided in response to the joint reception of the loop breaks and the dial tone signal from the switching facility.

8. A method of restricting telephone calls originating from a telephone station having input lines connected to a switching facility, the method comprising the steps of:
   establishing an initial telephone connection between the telephone station and the switching facility over the input lines;
   receiving a loop break from the switching facility, the loop break being reflective of a momentary interruption in the telephone connection;

receiving a dial tone signal from the switching facility; and activating a call screening process in the telephone station, the call screening process allowing only certain telephone calls to originate at the telephone station, and the activating step occurring in response to the joint reception of the loop break and the dial tone signal from the switching facility.

9. The method of claim 8 wherein the establishing step further includes the steps of receiving an initial telephone call through the switching facility, and enabling a telephone transmitter associated with the telephone station.

10. The method of claim 8 wherein the activating step further includes the step of disabling a telephone transmitter associated with the telephone station.

11. The method of claim 10 further including in order the steps of:

establishing a subsequent telephone connection between the telephone station and the switching facility over the input lines;

receiving a loop break from the switching facility, the loop break being reflective of a momentary interruption in the telephone connection;

receiving a dial tone signal from the switching facility; and terminating the telephone connection between the telephone station and the switching facility, the terminating step occurring in response to the joint reception of the loop break and the dial tone signal from the switching facility.

12. The method of claim 11 wherein the establishing step further includes the steps of receiving dial tone for the placing of a telephone call to a remote telephone station through the switching facility, and dialing the telephone number associated with the remote telephone station.

13. The method of claim 11 wherein the terminating step further includes the step of disabling a transmitter associated with the telephone station.

14. A method of restricting telephone calls originating from a telephone station having input lines connected to a switching facility, the method comprising the steps of:

establishing an initial telephone connection between the telephone station and the switching facility over the input lines;

receiving a loop break from the switching facility, the loop break being reflective of a momentary interruption in the telephone connection;

receiving a dial tone signal from the switching facility; and terminating the telephone connection between the telephone station and the switching facility, the terminating step occurring in response to the joint reception of the loop break and the dial tone signal from the switching facility.

15. The method of claim 14 wherein the establishing step further includes the steps of receiving dial tone for the placing of an initial telephone call to a remote telephone station through the switching facility, and dialing the telephone number associated with the remote telephone station.

16. The method of claim 14 wherein the terminating step further includes the step of disabling a transmitter associated with the telephone station.

* * * * *

UNITED STATES PATENT AND TRADEMARK OFFICE
CERTIFICATE OF CORRECTION

PATENT NO. : 4,782,516
DATED      : November 1, 1988
INVENTOR(S): Richard L. Maybach, S. Devendra Kishora Verma It is certified that error appears in the above-identified patent and that said Letters Patent is hereby corrected as shown below:

In the Claims, Column 6, line 3 "receiving" should read --activating--.

In the Claims, Column 6, line 58 "breaks" should read --break--.

Signed and Sealed this

Fourth Day of April, 1989

Attest:

DONALD J. QUIGG

Attesting Officer

Commissioner of Patents and Trademarks